(12) United States Patent
Jorde

(10) Patent No.: US 8,550,884 B2
(45) Date of Patent: Oct. 8, 2013

(54) CHAIN SAW SHARPENER

(75) Inventor: James E. Jorde, Basalt, ID (US)

(73) Assignee: Krash, Inc., Idaho Falls, ID (US)

( * ) Notice: Subject to any disclaimer, the term of this patent is extended or adjusted under 35 U.S.C. 154(b) by 0 days.

(21) Appl. No.: 13/585,723

(22) Filed: Aug. 14, 2012

(65) Prior Publication Data

US 2012/0304829 A1     Dec. 6, 2012

Related U.S. Application Data

(63) Continuation of application No. 12/352,560, filed on Jan. 12, 2009, now abandoned.

(60) Provisional application No. 61/010,922, filed on Jan. 10, 2008, provisional application No. 61/135,020, filed on Jul. 16, 2008.

(51) Int. Cl.
     *B23D 63/16*      (2006.01)
(52) U.S. Cl.
     USPC ............................................ 451/349; 76/80.5
(58) Field of Classification Search
     USPC ................. 451/349, 344; 76/80.5, 35–37
     See application file for complete search history.

(56) References Cited

U.S. PATENT DOCUMENTS

| | | | | | |
|---|---|---|---|---|---|
| 2,677,289 | A | * | 5/1954 | Fitch | 76/80.5 |
| 3,042,003 | A | * | 7/1962 | Cayo | 144/28.1 |
| 3,744,349 | A | * | 7/1973 | Juncker | 76/80.5 |
| 4,404,871 | A | * | 9/1983 | Fritz et al. | 76/80.5 |
| RE31,504 | E | * | 1/1984 | Aksamit | 76/80.5 |
| 4,677,881 | A | * | 7/1987 | Jorde | 76/80.5 |
| 4,864,897 | A | * | 9/1989 | Newman | 76/80.5 |
| 5,983,755 | A | * | 11/1999 | Juncker et al. | 76/80.5 |
| 6,058,806 | A | * | 5/2000 | Ford | 76/80.5 |
| 2009/0199680 | A1 | | 8/2009 | Jorde | |

* cited by examiner

*Primary Examiner* — Hadi Shakeri
(74) *Attorney, Agent, or Firm* — Thorpe North & Western LLP

(57) ABSTRACT

A chain saw sharpening device having a generally U-shaped frame defined by an upper web and first and second parallel side walls for overlying the chain and the guide bar of the chain saw. The frame includes an open area near the center of the upper web defining a sharpening area. Clamping screws are associated with the frame to secure the frame to the cutting bar and an additional clamping screw is associated with the frame for engaging the link of the tooth to be sharpened in order to fix its position with respect to the sharpening area of the frame. A rotary burr having an abradant surface is receivable in either of two diagonally disposed, independently removable bore guides for sharpening left-hand and right-hand cutting teeth.

20 Claims, 6 Drawing Sheets

CHAIN SAW SHARPENER

RELATED APPLICATIONS

This application is a continuation application claiming the benefit of U.S. patent application Ser. No. 12/352,560, filed Jan. 12, 2009, entitled, "CHAIN SAW SHARPENER," which claims the benefit of U.S. Provisional Patent Application Ser. No. 61/010,922, entitled, "Timber Lion Hand Held Precision Chain Saw Sharpener," filed on Jan. 10, 2008, and U.S. Provisional Patent Application Ser. No. 61/135,020, entitled, "Timber Lion Improved Hand Held Chain Saw Sharpener," filed on Jul. 16, 2008 each of which are incorporated in their entirety by reference and made a part hereof.

BACKGROUND OF THE INVENTION

1. Field of the Invention: The present invention relates to an improved device for sharpening the teeth of a chain saw and, more particularly, to a chain saw sharpener that permits the consecutive sharpening of left-hand and right-hand teeth and provides for the accurate, uniform sharpening of the chain saw teeth despite repeated use.

2. State of the Art: An assortment of portable devices are available for the on-site sharpening of the teeth of a chain saw. Such devices are typified by U.S. Pat. Nos. 4,404,871 and 3,744,349, in which the sharpening devices are secured to the cutter bar of the chain saw so as to overlie the chain and a removable burr is rotatable with respect to each device to sharpen the teeth of the chain.

Common problems accompany the use of these sharpening devices, principal among them being the inability to uniformly sharpen both the left-hand and right-hand teeth, and the repeated adjustment of the sharpening device in an attempt to so sharpen the chain saw teeth. Uniformity in the size and shape of the cutting teeth is essential for obtaining a straight, even cut through a work piece. Additionally, the devices of the above-referenced patents require a relatively involved setup procedure in which a plurality of jig members must be manipulated before a person is able to use the sharpening device. Because of the numerous adjustments required to set up their devices, the settings of the sharpening devices invariably change during use, resulting in either a constant readjustment of the devices or a non-uniform sharpening of the chain saw teeth.

In use, each sharpener described in the above-referenced patents first sharpen all the teeth of a like hand (i.e., either all the left-hand teeth or all the right-hand teeth) and then the sharpener is readjusted to sharpen the teeth of the opposite hand. This requires that the jig members be repeatedly manipulated for sharpening the teeth of opposite hands. Further, the readjustment after first sharpening all the teeth of one hand often results in an undesirable variance between the teeth of the opposite hands. An additional series of relatively complicated adjustments also must be made to cut the depth gauge portions of the teeth.

The rake angle of the teeth on different makes of saw chains often varies, the rake angle typically being 25°, 30°, or 35° with respect to a reference line perpendicular to the cutting bar of the chain saw. However, the above-mentioned devices are able to sharpen the teeth of only one rake angle, thus limiting their utility.

U.S. Pat. No. 4,677,881 is also a portable device for sharpening the teeth of a chain saw and is an improvement over prior devices. However although it allows for the sharpening the teeth of opposite hands and of different rake angle, it requires extensive machining to manufacture. This machining makes this sharpener expensive. Further to allow for the sharpening of teeth of different rake angles, an entire section of the sharpener must be removed and replaced. This adds to the cost of the sharpener and complexity of the sharpener.

BRIEF SUMMARY OF THE INVENTION

A device for sharpening the cutting teeth of a chain saw while the chain is in place on the guide bar of the chain saw is presented. The device has a frame that may be formed by extruding to reduce cost of the device. The frame has an upper web and first and second parallel side walls for overlying the chain and guide bar of the chain saw. An open area is formed in the frame adjacent the center of the upper web defining a sharpening area. A clamp means associated with the first side wall may secure the frame to the guide bar. A different clamp means may be used to lightly engage the chain saw tooth to be sharpened in order to fix its position with respect to the sharpening area.

A tooth stop pawl is provided for adjusting the position of the tooth within the sharpening area. The tooth stop pawl is mounted in a sliding block received in a keyway in the upper web of the frame. If the frame is formed in an extrusion process, the keyway may extend from a first end of the upper web to a second end. The keyway is aligned with the guide bar of the chain saw and permitting only a single degree of freedom in the direction of the guide bar. A pawl is pivotally attached to the sliding block and extends into the open sharpening area. An adjustment bolt may be associated with the sliding block of the tooth stop pawl and rotatably captured with respect to the frame for adjusting the position of the sliding block along the length of the keyway. In certain embodiments, the adjustment bolt is a washer faced bolt that is rotatably captured by an indent within the keyway with a sliding block being threaded along a channel on its bottom and a corresponding channel in the keyway being free of threads.

A burr guide may be disposed within the second wall of the frame. Each burr guide is independently removable and attachable to the housing. In certain embodiments, channels may be formed in the side wall for receiving therein the burr guides. The channels may be bores formed in the side wall. Such bores may have a center axis that crosses the center of the sharpening area at an angle between about 20° and 40° including at an angle of about 30°.

In certain embodiments, the bores of the guides are disposed at an angle from a center axis for the guide. The angle may be in the range from about 1° to about 10°. In other embodiments, the angle is about 5°. This configuration will allow the same burr guide to be used to precisely sharpen teeth having differing guide angles. For example if the bore is cut in the side wall at an angle to the tooth of about 30°, then a burr guide having an bore that deviates about 5° from its center axis will be configured to sharpen a tooth having a cutting surface of about 25° in when the guide is in a first position and configured to sharpen a tooth having a cutting angle of about 35° when the guide means is rotated about its center axis 180°. In yet other embodiments, the bore of the burr guide may be coaxial to the center axis of the burr guide.

The first and second bores in the side wall of the frame may taper from a larger diameter adjacent the outside of the second wall to a smaller diameter adjacent the sharpening area. In this configuration, the bore guides may have a substantially conical form.

DETAILED DESCRIPTION OF THE INVENTION

Figure 1:
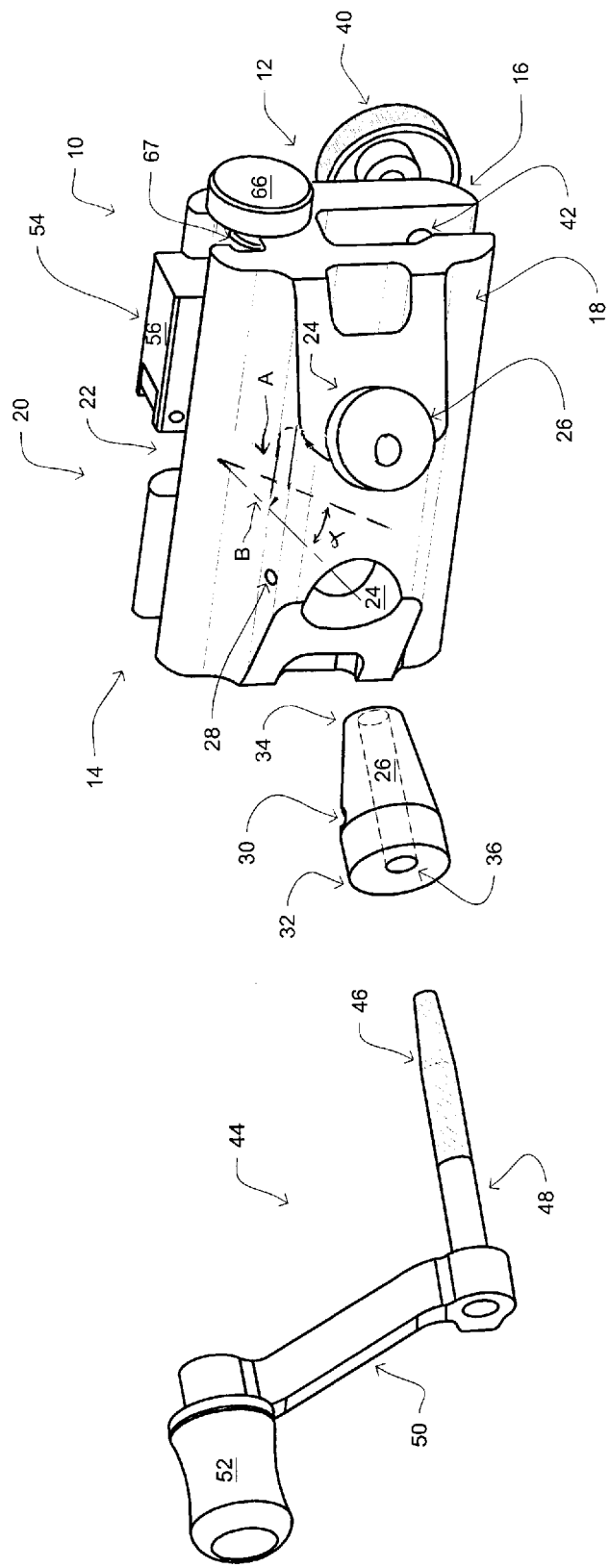
FIG. 1 is a perspective view of one embodiment of chain saw sharpener.
Figure 2:
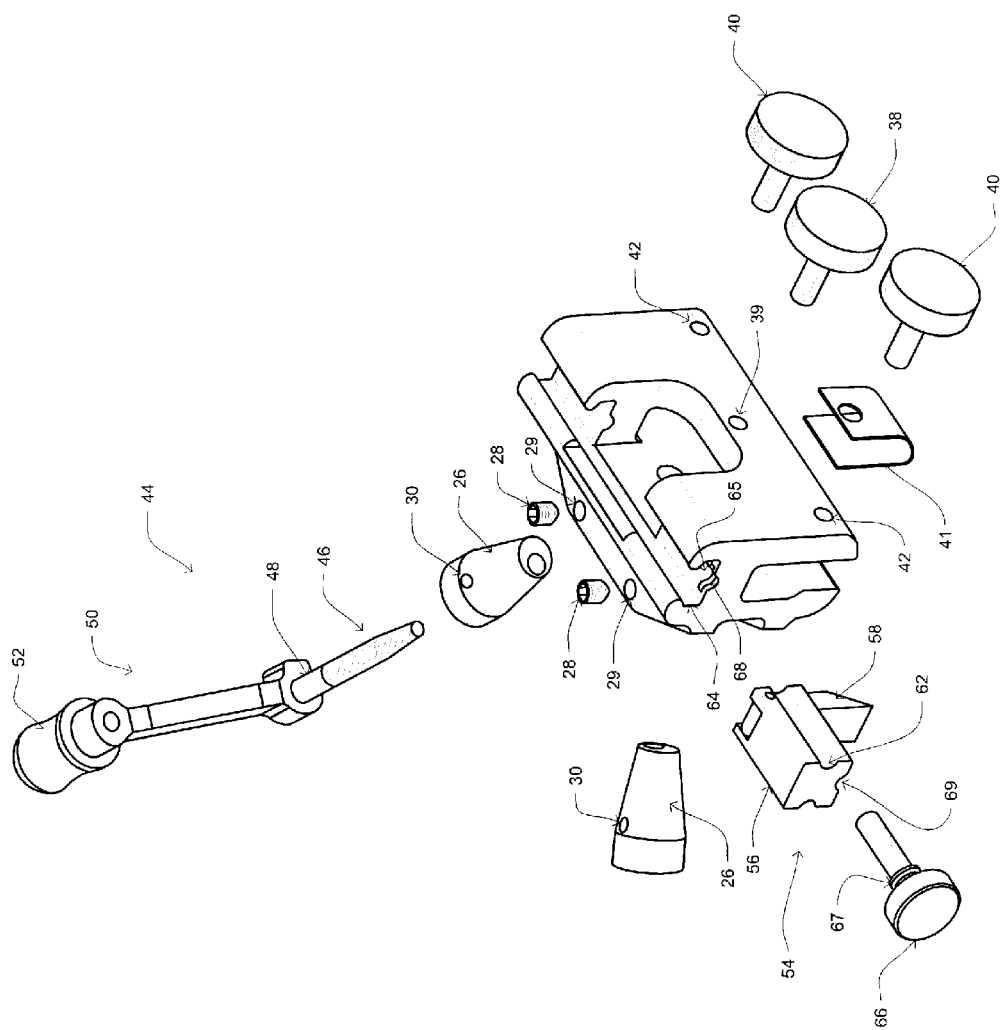
FIG. 2 is a reversed perspective view of the embodiment of FIG. 1
Figure 3:
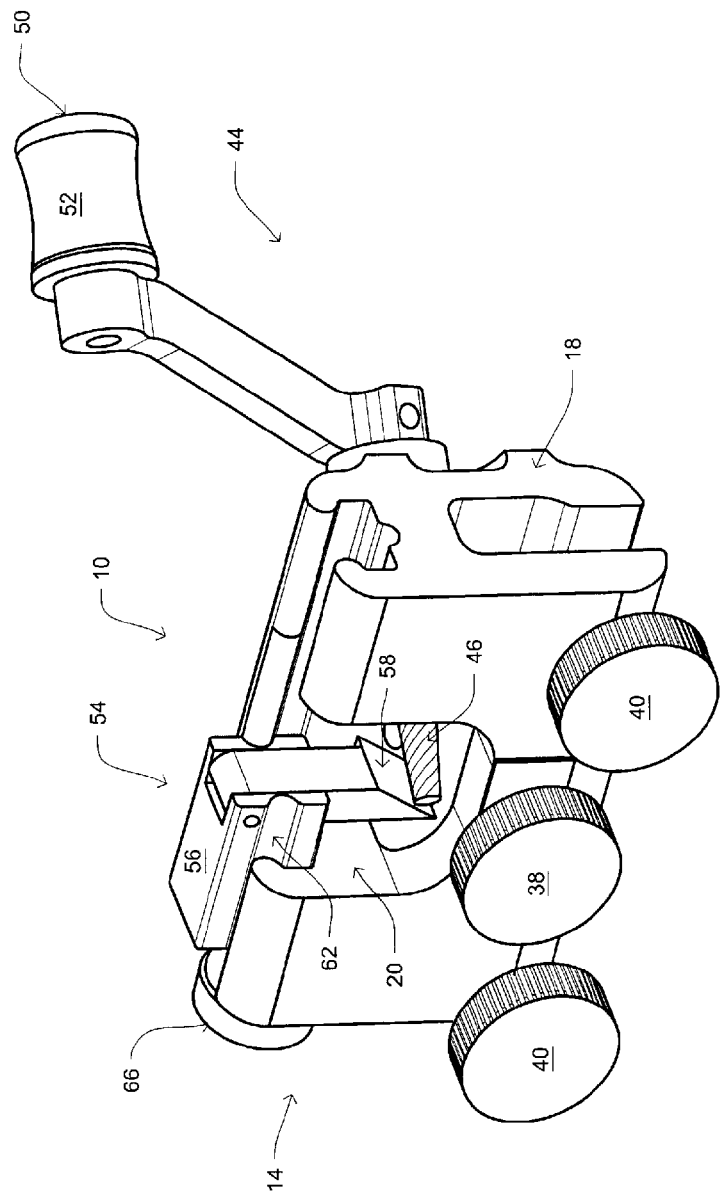
FIG. 3 is an exploded view of the embodiment of FIGS. 1 and 2.

It is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be determined by the appended claims and equivalents thereof As used herein, "comprising," "including," "containing," "characterized by," and grammatical equivalents thereof are inclusive or open-ended terms that do not exclude additional, unrecited elements or method acts.

As used herein, "about" means reasonably close to, a little more or less than the stated number or amount, or approximately.

As used herein, "exemplary" means serving as an example of The use of the term "exemplary" herein in connection with a particular embodiment is not to be construed as the particular embodiment being preferred over any other embodiment.

Referring to FIGS. 1-4 an exemplary embodiment of a chain saw sharpener generally indicated by 10. The sharpener may be placed on the cutter or guide bar of a chain saw (not shown) in order to sharpen the teeth of a saw chain. The saw chain is of a well known design and includes left-hand and right-hand cutting teeth, arranged alternately on opposite sides of the chain and connected by tie straps or side links to driver links to form a one-piece endless chain. The driver links have a projecting portion that is received in a guide channel that extends about the periphery of the guide bar.

The sharpener 10 includes a generally U-shaped frame 12 having an upper web 14 connecting first and second side walls 16, 18 respectively. A central portion 20 of the upper web 14 and the first side wall 16 is cut away to define an open area 22 through the web 14 and side wall 16 for receiving the chain saw tooth be sharpened. The second side wall 18 also has channels 24 diagonally formed from exterior to the open area 22. In the illustrated embodiment, the channels 24 take the form of bores 24. However, in other embodiments, the channels 24 may take other forms. The channels/bores 24 are configured to each independently receive a removable burr guide 26. The independently removable burr guides 26 can be secured within the bores 24 by tightening set screws 28 within holes 29. The burr guides have an indent 30 for receiving a portion of the screws 28.

In the illustrated embodiment, the burr guides 26 are tapered from first diameter at a first end 32 to a narrower diameter at a second end 34. Corresponding tapers are found in the bores 24 within the second side wall 18. The burr guides 26 have a conduit 36 extending from the first end 32 to the second end 34. The conduit 36 may be a bore 36 as illustrated.

The center axis B of bores 24 is symmetrically inclined about a line A perpendicular to the guide bar of the chain and the sharpening area at an angle a. Angle a may vary but may be in the range from about 20° to about 40°. In one presently preferred embodiment angle α is about 30°.

Figure 4:
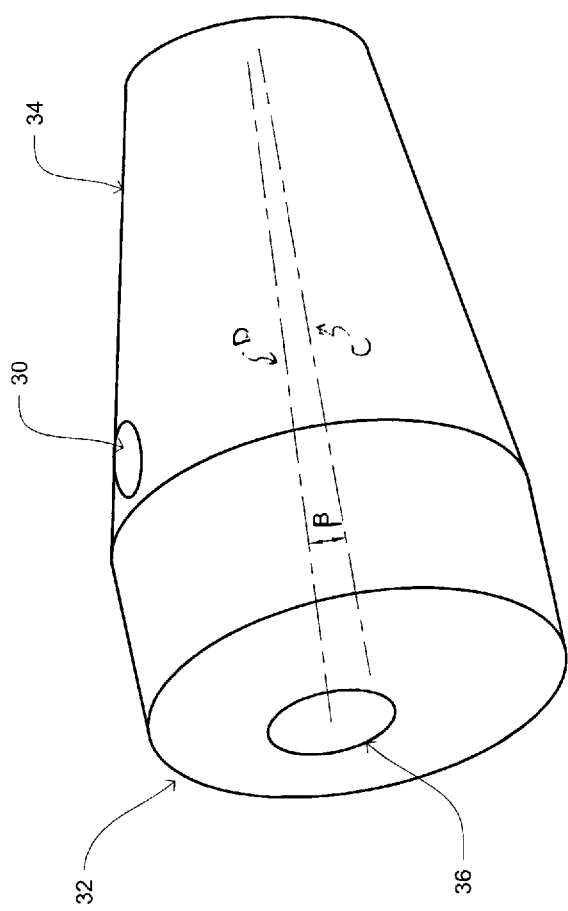
FIG. 4 is a perspective view of a burr guide of one embodiment of the invention.

The bore 36 of the burr guides 26 can be formed at an angle 13 to the center axis C of the burr guides 26. For example as seen in FIG. 4, the center axis D of the bore 36 forms an angle β with the center axis C of the burr guide. The angle β can vary and may be coaxial with the center axis C (0°) or may be in the range from about 1° to about 10°.

The angle β of the bore 36 is selected, when combined with the angle α of the bore 24, to substantially equal the rake angle of the tooth to be sharpened. For example if the rake angle of the tooth is 30° and the angle a is about 30° then the angle β of the burr guide bore 36 can be about 0° (coaxial with the center axis C of the burr guide 26).

Likewise if the rake angle is about 35° and the center and the angle α is about 30° then the angle β of the burr guide bore 36 can be about 5°. This combination of 30° and 5° will equal the rake angle 35° of the tooth. In certain embodiments, and burr guide 26 having a bore 36 at an angle β of about 5° from the center axis C may be rotated 180° to create an angle of about −5°. This reversed bore guide 26 will then have a combined angle of about 25° and can be used to sharpen a tooth having a rake angle of about 25°.

To securely position a tooth of the saw chain within the open sharpening area 22 of the frame 12, a clamping screw 38 is received within an internally-threaded bore 39 in the side wall 16 disposed adjacent the opening 22. The clamping screw 38 acts on a U-shaped spring clamp 41. The spring clamp 41 serves to maintain the perpendicular alignment of left-hand teeth during sharpening. Perpendicular alignment of right-hand teeth is maintained by their contact during sharpening with the side wall 18. When a tooth link is positioned within the opening 22 the clamp screw 38 is adjusted to hold the link in place.

To securely hold the sharpener 10 onto the guide bar of the chain saw, the frame 12 is supplied with additional clamping screws 40 received in threaded bores 42 in the lower, outer portions of the side wall 16. The ends of the screws 40 may be cupped (as opposed to being flat or rounded) in order to provide increased holding power between the screws 40 and the guide bar. When the sharpener 10 is positioned over the guide bar, the clamping screws 40 are tightened to hold the guide bar against the shoulder on the lower interior portion of the side wall 16 to prevent relative motion between the sharpener 10 and the guide bar.

With a tooth link properly aligned within the sharpening area 22 and the sharpener 10 clamped onto the guide bar, the tooth is sharpened by means of a rotary cutter or burr, generally indicated by 44, that is inserted into either of the bores 36 of the burr guides 26. The rotary burr 44 is preferably made of a high-impact carbide material that is highly chip-resistant and has a conically-shaped, spiral, abradant cutting surface 46. The shaft portion 48 is sized in diameter to be slightly less than the inside diameter of the bores 36 so as to provide the accurate rotation of the rotary burr 44 about the axis of either of the bores 36. A crank member 50 is secured to the shaft portion 48 a freely-rotatable handle 52 is secured to the crank member 50.

In keeping with the invention, means are provided for accurately positioning the tooth links within the opening 22 of the sharpener 10 so as to repeatedly and precisely position subsequently-sharpened teeth within the opening, resulting in that all the teeth will be sharpened to the same extent and length. Such uniformity in size of the sharpened teeth ensures a straight, even cut through a workpiece, eliminating chain tooth radius cutting. To this end, a tooth stop, generally indicated by 54, is movably secured to the frame 12 of the sharpener 10 so as to engage the rearmost portion of a tooth link, whether a left-hand or right-hand tooth, to position each such tooth link at the same position within the opening 22 in the frame 12 with respect to the rotary burr 44.

The tooth stop 54 comprises a pawl-support block 56 having a forked end to which a pawl member 58 is so that the pawl 58 is able to pivot out away from the support block 56 but abuts the support block 56 so that the pawl 58 cannot pivot in toward the support block 56 past an angle substantially perpendicular to the support block 56.

Integral with the support block 56 is a slide member 62 that interfits with an undercut slot 64 in the upper surface of the web portion 26 of the sharpener frame 24. As illustrated, the slide member 62 is in the form of a dovetail tenon and the slot 64 is in the complementary form of a dovetail mortise, the undercut slot 64 extending from one end of the frame 12 to the other. The slide member 62 and undercut slot 64 are manufactured to close tolerances so that any movement of the support block 56 other than along the slot 64 is substantially eliminated, i.e., the support block 56 has only a single degree of freedom along the length of the slot 64 and will not move up and down or angularly with respect to a vertical axis through the slot.

In order to precisely position the support block 56 along the length of the undercut slot 64 (and, consequently, precisely locate the pawl member 58 within the opening 30) a threaded adjustment bolt 66 has a washer face 67 that is captured within in a detent 68 formed in the slot 64. The slot has a half channel 65 that is not threaded and the block 56 has a half channel 69 that is threaded. The threaded portion of the bolt 66 is received in threaded half channel 69 in the block 56 so that, upon rotation of the bolt 66, the threaded portion will be advanced into or retracted from the threaded channel 69 so as to slide the tooth stop 54 along the undercut slot 64. Depending upon the pitch of the screw thread and the number of threads per inch, extremely fine adjustment of the position of the tooth stop pawl 58 can be obtained by manipulating the adjustment bolt 66.

To use the sharpener 10 for accurate sharpening of the chain saw teeth, the frame 12 is initially placed over the guide bar of the chain saw with the rotary burr 44 fully inserted into a bore 36 and engaging the cutting portion of a tooth that has the same rake angle as the combined angle of the bore 36 and channel 24 containing the burr 48. The frame 12 is then positioned to be parallel to the guide bar and the clamping screws 40 are securely tightened against the guide bar to maintain the relative positions of the sharpener 10 and guide bar. The tooth stop pawl adjustment bolt 66 is rotated to move the tooth stop 54 along the undercut slot 64 until the pawl member 58 abuts the rearmost portion of the tooth that is to be sharpened to position the tooth snugly against the rotary burr 44. The rotary burr 44 is then removed from the guide bore 36 and the adjustment bolt 66 is rotated a predetermined fraction of a revolution to advance the tooth stop pawl 58 (and thus the tooth to be sharpened) across the opening 22 in the sharpener into a part of the area vacated by the rotary burr 48. This sets the depth of cut for the burr 48. With the rearmost portion of the tooth still firmly abutting the tooth stop pawl 58, the clamping screw 38 is advanced so as to force the spring clip 40 into light engagement with the tooth, thus maintaining the position of the tooth relative to the sharpener 10. No further adjustment of the screw 38 is necessary. The rotary burr 48 is then reinserted into the appropriate guide bore 36 until contact with the tooth is established, upon which the burr 48 is rotated in a clockwise direction while fully inserting the burr 48 into the guide bore 36 to completely sharpen the tooth. The burr 48 is then withdrawn from the guide bore 36, and the chain is advanced to move the adjacent tooth in the chain (which is of the opposite hand) underneath the pawl member 58. The pawl member 58 is pivoted in a counterclockwise direction as the next tooth passes thereunder into the sharpening area 22. Once the tooth passes the pawl 58 and the pawl 58 pivots back to its substantially vertical position, the chain is moved in the opposite direction to abut the rearmost portion of the tooth firmly against the tooth stop pawl 58. Thus, the subsequently-introduced tooth is positioned in the sharpening area 22 in the identical location as the previously-sharpened tooth. The rotary burr 44 is inserted into the alternate guide bore 36 to sharpen the tooth. The foregoing process is repeated, the rotary burr 44 alternating between bore guides depending upon the hand of the tooth to be sharpened, until all the teeth are sharpened.

Figure 5:
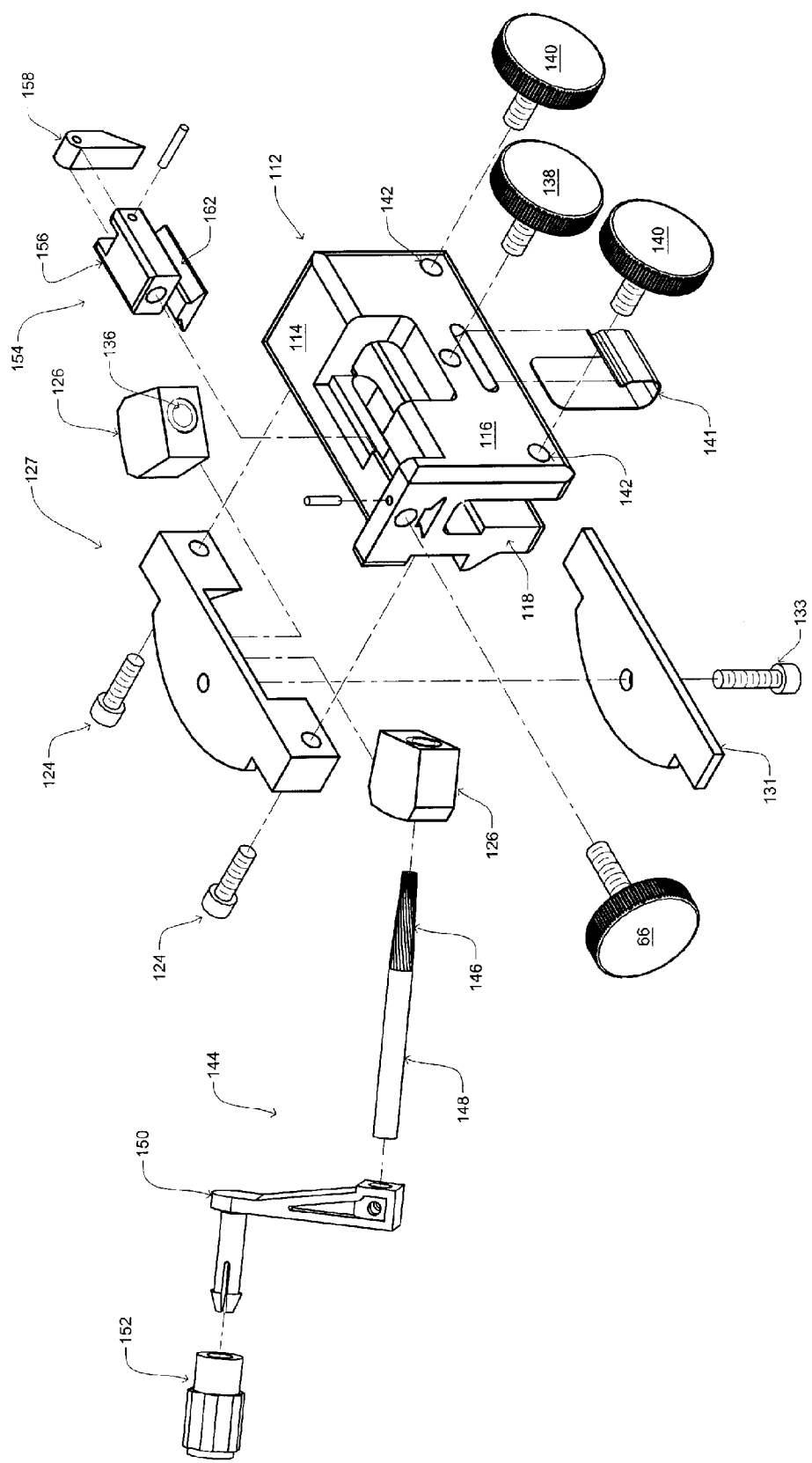
FIG. 5 is a perspective of an alternative embodiment of a chain saw sharpener.
Figure 6:
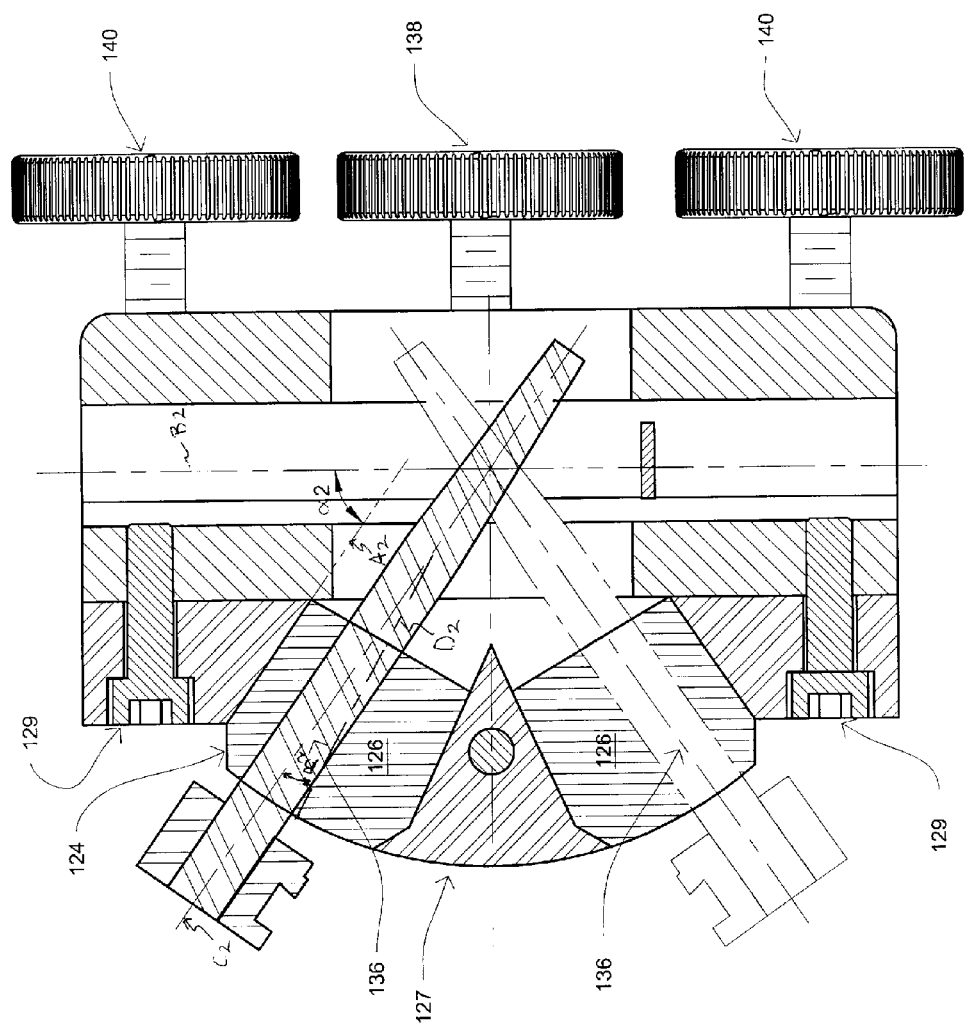
FIG. 6 is a cutaway view of the embodiment of FIG. 5.

Referring now to FIGS. 5 and 6 an alternative embodiment of a chain saw sharpener 110 in conjunction with the present invention is shown. The sharpener 110 of the alternative embodiment has many parts and function in common with the sharpener 10 previously described. The sharpener 110 includes a generally U-shaped frame 112 having an upper web 114 connecting first and second side walls 116, 118 respectively. A central portion 120 of the upper web 114 and the first side wall 116 is cut away to define an open area through the web 114 and side wall 116 for receiving the chain saw tooth 114 to be sharpened. The channels 124 are configured to each independently receive a removable burr guide 126. The independently removable burr guides 126 can be secured and removed from the channels 124 by removing the bore guide housing 127 from the frame 112 by loosening screws 129 and then removing top plate 131 by loosening screw 133.

Much like the previous embodiment, the burr guides 126 are inclined toward a line A2 perpendicular to the guide bar of the chain and the sharpening area at an angle α2. The angle α2 may vary but may be in the range from about 20° to about 40°. In one presently preferred embodiment angle α2 is about 30°.

The center axis C2 of the bore 136 of the burr guides 126 may be varied and may be at an angle β2 from center line D2 of the burr guides 126 so that when the bore guide is in a first position it is configured to sharpen a tooth having a first rake angle and when it is rotated 180° it is configured to sharpen a tooth having a second rake angle. For example if angle α2 is about 30° and angle β2 is about 5°, the combined angles may be used to sharpen a tooth having a rake angle of about 35° in a first position and a rake angle of about 25° when it is rotated about line D2 180° to a second position.

The invention claimed is:

1. A device for sharpening the cutting teeth of a chain saw while the chain is in place on the guide bar of the chain saw, the device comprising:

a frame having an upper web and first and second parallel side walls for overlying the chain and guide bar of the chain saw;

an open area adjacent the center of the upper web defining a sharpening area;

clamp means associated with the first side wall to secure the frame to the guide bar;

second clamp means associated with the first side wall for lightly engaging the chain saw tooth to be sharpened in order to fix its position with respect to the sharpening area;

a tooth stop pawl for adjusting the position of the tooth within the sharpening area, the tooth stop pawl being mounted in a sliding block received in a keyway in the upper web of the frame, the keyway being aligned with the guide bar of the chain saw and permitting only a single degree of freedom in the direction of the guide bar;

a pawl member pivotally attached to the sliding block extending into the open sharpening area;

an adjustment bolt associated with the tooth stop pawl and rotatably captured with respect to the frame for adjusting the position of the sliding block along the length of the keyway;

first and second channels formed in the frame at an angle relative to the guide bar of the chain saw; and first and second guide means being independently removable from the first and second channels, and having bores for receiving therein a rotary burr for sharpening the teeth of the chain saw, wherein the first and second guide means comprise a tapered configuration, wherein the first and second channels comprise a tapered configuration corresponding to the tapered configuration of the first and second guide means to provide a wedge fit, wherein interfacing portions of the guide means and the channels are configured to maintain a collinear relationship of center axes of the guide means and the respective channels under operating loads upon rotation of the rotary burr to sharpen the teeth of the chain saw, and wherein each of the bores comprise an angle that combines with the angle of the respective channels to provide a specific cut angle on the tooth, and wherein each of the first and second guide means are fixedly positionable in a first position or a second position to alter the position of the rotary burr relative to the cutting teeth of the chain saw.

2. The device of claim 1 wherein the guide mean bores are disposed at an angle from a center axis for the guide means.

3. The device of claim 2 wherein the angle ranges from about 1° to about 10°.

4. The device of claim 2 wherein the angle is about 5°.

5. The device of claim 4, wherein the device is configured to sharpen a tooth having a cutting surface of about 25° when the first guide means is in the first position and configured to sharpen a tooth having a cutting angle of about 35° when the first guide means is rotated about its center axis 180° to the second position.

6. The device of claim 1, wherein the device is configured to sharpen a tooth having a cutting surface of about 25° when the first guide means is in the first position and configured to sharpen a tooth having a cutting angle of about 35° when the first guide means is rotated about its center axis 180° to the second position.

7. A device for sharpening the cutting teeth of a chain saw while the chain is in place on the guide bar of the chain saw, the device comprising:

a frame having an upper web and first and second parallel side walls for overlying the chain and guide bar of the chain saw;

an open area adjacent the center of the upper web defining a sharpening area;

first and second channels disposed diagonally in the second side wall at an angle relative to the guide bar of the chain saw; and a plurality of independently removable guide means to be received in the channels, each of the plurality of guide means having a bore configured to receive a rotary burr for sharpening the teeth of the chain saw, wherein the guide means comprise a tapered configuration, wherein the first and second channels comprise a tapered configuration corresponding to the tapered configuration of the guide means to provide a wedge fit, wherein interfacing portions of the guide means and the channels are configured to maintain a collinear relationship of center axes of the guide means and the respective channels under operating loads upon rotation of the rotary burr to sharpen the teeth of the chain saw, and wherein each of the bores comprise an angle that combines with the angle of the respective channels to provide a specific cut angle on the tooth, and wherein each of the guide means are fixedly positionable in a first position or a second position to alter the position of the rotary burr relative to the cutting teeth of the chain saw.

8. The device of claim 7 wherein the center axes of the first and second channels cross the center line of the sharpening area at an angle in the range from about 20° to about 40°.

9. The device of claim 7 wherein the center axes of the first and second channels cross the center line of the sharpening area at an angle of about 30°.

10. The device of claim 9, wherein a first of the guide means bores is disposed at an angle from a center axis of a first of the guide means.

11. The device of claim 10 wherein the angle from the center axis of the first guide means ranges from about 1° to about 10°.

12. The device of claim 11 wherein the angle from the center axis of the first guide means is about 5°.

13. The device of claim 12, wherein the device is configured to sharpen a tooth having a cutting surface of about 25° when the first guide means is in a first position and configured to sharpen a tooth having a cutting angle of about 35° when the first guide means is rotated about its center axis 180°.

14. The device of claim 9 wherein the plurality of guide means comprises a first pair and a second pair of guide means to be alternately received in the first and second channels, the first pair having bores coaxial to the center axes of the respective guide means and the second pair having bores disposed at an angle of about 5° from the center axes of the respective guide means.

15. The device of claim 7, wherein the first and second channels taper a larger diameter adjacent the outside of the second wall to a smaller diameter adjacent the sharpening area.

16. The device of claim 15, wherein the guide means have a substantially conical form.

17. A device for sharpening the cutting teeth of a chain saw while the chain is in place on the guide bar of the chain saw, the device comprising:

a frame having an upper web and first and second parallel side walls for overlying the chain and guide bar of the chain saw;

an open area adjacent the center of the upper web defining a sharpening area;

clamp means associated with the first side wall to secure the frame to the guide bar;

second clamp means associated with the first side wall for lightly engaging the chain saw tooth to be sharpened in order to fix its position with respect to the sharpening area;

a tooth stop pawl for adjusting the position of the tooth within the sharpening area, the tooth stop pawl being mounted in a sliding block received in a keyway in the upper web of the frame, the keyway being aligned with the guide bar of the chain saw and permitting only a single degree of freedom in the direction of the guide bar;

a pawl member pivotally attached to the sliding block extending into the open sharpening area; an adjustment bolt associated with the tooth stop pawl and rotatably captured with respect to the frame for adjusting the position of the sliding block along the length of the keyway;

first and second channels disposed diagonally in the second side wall at an angle relative to the guide bar of the chain saw; and guide means received in each of the channels and being removable therefrom, the guide means each having a bore configured to receive a rotary burr for sharpening the teeth of the chain saw, wherein the guide means comprise a tapered configuration, wherein the first and second channels comprise a tapered configuration corresponding to the tapered configuration of the guide means to provide a wedge fit, wherein interfacing portions of the guide means and the channels are configured to maintain a collinear relationship of center axes of the guide means and the respective channels under operating loads upon rotation of the rotary burr to sharpen the teeth of the chain saw.

18. The device of claim 17 wherein the center axes of the first and second channels cross the center line of the sharpening area at an angle of about 30° and each guide mean bore is disposed at an angle of about 5° from a center axis of the guide means.

19. Device of claim 17 wherein web, first and second parallel side walls, and key way are formed in an extrusion process.

20. The device of claim 17 wherein sliding block comprises a semicircular threaded channel on a bottom side, the threaded channel configured to receive therein a screw for advancing and retracting tooth stop pawl.

* * * * *